United States Patent
Menon et al.

(10) Patent No.: US 11,607,816 B2
(45) Date of Patent: Mar. 21, 2023

(54) DETECTING ROBOT GRASP OF VERY THIN OBJECT OR FEATURE

(71) Applicant: Dexterity, Inc., Redwood City, CA (US)

(72) Inventors: Samir Menon, Palo Alto, CA (US); Zhouwen Sun, Santa Clara, CA (US); Harry Zhe Su, Union City, CA (US)

(73) Assignee: Dexterity, Inc., Redwood City, CA (US)

( * ) Notice: Subject to any disclaimer, the term of this patent is extended or adjusted under 35 U.S.C. 154(b) by 168 days.

(21) Appl. No.: 17/029,415

(22) Filed: Sep. 23, 2020

(65) Prior Publication Data

US 2021/0122056 A1  Apr. 29, 2021

Related U.S. Application Data

(60) Provisional application No. 62/926,155, filed on Oct. 25, 2019.

(51) Int. Cl.
*B25J 13/08* (2006.01)
*B25J 19/02* (2006.01)

(52) U.S. Cl.
CPC ........... *B25J 13/084* (2013.01); *B25J 13/082* (2013.01); *B25J 13/085* (2013.01); *B25J 19/023* (2013.01); *B25J 19/027* (2013.01)

(58) Field of Classification Search
CPC ...... B25J 13/084; B25J 13/082; B25J 13/085; B25J 19/023; B25J 19/027
See application file for complete search history.

(56) References Cited

U.S. PATENT DOCUMENTS

| | | | |
|---|---|---|---|
| 3,986,007 | A | 10/1976 | Ruoff, Jr. |
| 4,605,354 | A | 8/1986 | Daly |
| 4,766,389 | A | 8/1988 | Rhoades |
| 6,909,084 | B2 | 6/2005 | Tachi |
| 10,286,565 | B1 | 5/2019 | Swiercz |
| 10,682,774 | B2 | 6/2020 | Bingham |
| 2012/0253512 | A1 | 10/2012 | Sato |
| 2017/0239821 | A1 | 8/2017 | Lessing |
| 2018/0250831 | A1 | 9/2018 | Hashimoto |
| 2018/0264660 | A1 | 9/2018 | Bergeron |

(Continued)

FOREIGN PATENT DOCUMENTS

JP  3412465  6/2003

*Primary Examiner* — Kira Nguyen
(74) *Attorney, Agent, or Firm* — Van Pelt, Yi & James LLP

(57) ABSTRACT

A plurality of sensors are configured to provide respective outputs that reflect a sensed value associated with engagement of a robotic arm end effector with an item. The respective outputs of the plurality of sensors are used to make a determination associated with engagement of a robotic arm end effector with an item. A first value measured by a first sensor is used to determine a first input associated with a first factor. A second value measured by a second sensor is used to determine a second input associated with a second factor. The first input and the second input are provided to a multi-factor model configured to provide, based at least in part on the first input and the second input, an output associated with engagement of the robotic arm end effector with the item. The output of the multi-factor model is used to make the determination associated with engagement of the robotic arm end effector with the item.

21 Claims, 9 Drawing Sheets

(56) References Cited

U.S. PATENT DOCUMENTS

| | | | |
|---|---|---|---|
| 2019/0248003 A1* | 8/2019 | Nagarajan | B25J 9/1697 |
| 2020/0019864 A1 | 1/2020 | Gu | |
| 2020/0094412 A1* | 3/2020 | Casse | G01L 5/226 |
| 2021/0101292 A1* | 4/2021 | Kuppuswamy | B25J 15/12 |
| 2021/0278300 A1* | 9/2021 | Bao | B25J 13/084 |
| 2021/0283771 A1* | 9/2021 | Ijiri | B25J 9/1635 |
| 2021/0354316 A1* | 11/2021 | Nabeto | B25J 15/08 |

* cited by examiner

330

340

350

Top View     Side View

352

360

Top View     Side View

362

DETECTING ROBOT GRASP OF VERY THIN OBJECT OR FEATURE

CROSS REFERENCE TO OTHER APPLICATIONS

This application claims priority to U.S. Provisional Patent Application No. 62/926,155 entitled DETECTING ROBOT GRASP OF VERY THIN OBJECT OR FEATURE filed Oct. 25, 2019 which is incorporated herein by reference for all purposes.

BACKGROUND OF THE INVENTION

A robotic system may be tasked with moving one or more items from a first location to a second location. The robotic system selects to move one of the one or more items. The robotic system uses a robotic arm end effector to grasp the selected item. However, depending on the size or shape of the selected item, it may be difficult to determine whether the robotic arm end effector actually grasped the selected item. It can be difficult, in particular, to distinguish between a missed grasp and a successful grasp of a very thin item or feature, since finger position relative to each other may be only slightly different.

BRIEF DESCRIPTION OF THE DRAWINGS

Various embodiments of the invention are disclosed in the following detailed description and the accompanying drawings.

DETAILED DESCRIPTION

Figure 1:
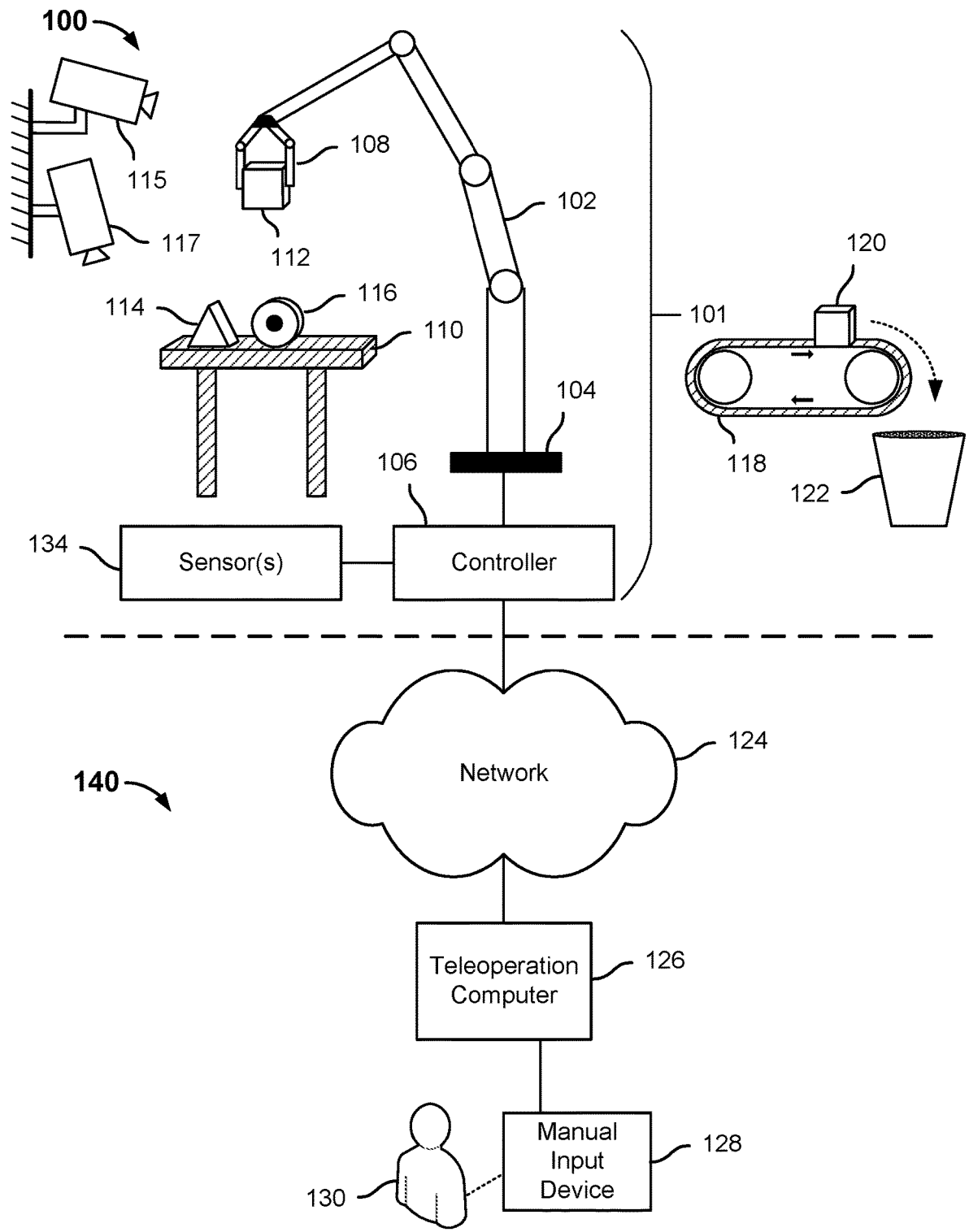
FIG. 1 is a block diagram illustrating a system for picking and placing items in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to determine whether a robotic arm end effector successfully grasped an item. In various embodiments, a tactile sensing unit is provided. The tactile sensing unit includes and/or receives sensor output values generated by one or more sensors. The one or more sensors may include one or more of magnetic sensors, optical sensors, electromechanical sensors, pressure sensors, strain gages, force sensors, conductivity sensors, current sensors, voltage sensors, capacitance sensors, resistance sensors, inductance sensors, infrared sensors, temperature sensors, etc. Each of the one or more sensors is configured to provide an output that reflects a sensed value associated with engagement of the robotic arm end effector with an item (also referred to as an "object"). The one or more sensor outputs are used to determine one or more factors indicative of engagement of the robotic arm end effector with an item. The one or more factors may include weight, deformation, continuity, conductivity, pressure, resistance, inductance, capacitance or any other factor that is indicative of robotic arm end effector engagement.

The tactile sensing unit may be associated with a robotic arm end effector. A robotic arm end effector may include two or more fingers. A corresponding tactile sensing unit may be attached to each of the fingers. The end effector may include one or more suction cups, or other structures to engage an item, and a corresponding tactile sensing unit may be attached to each of the suction cups or other structure used to engage items. In some embodiments, one or more tactile sensing units are included in a sensing covering (e.g., glove, mitten, etc.) that is placed over the fingers of the robotic arm end effector such that each of the fingers has an associated tactile sensing unit. In some embodiments, one or more tactile sensing units are embedded in the robotic arm end effector.

The tactile sensing unit may include a plurality of sensing layers. Each of the sensing layers may include one or more sensors. The tactile sensing unit may include one or more of a conductive layer, a deformation layer, and a substrate layer. When engaged with an item, each of the sensors of the tactile sensing unit may output a corresponding sensed value that is different from a nominal sensed value (e.g., when the robotic arm end effector is not engaged with an item).

The conductive layer may include conductive material (e.g., metal) that enables continuity or other electrical properties, such as conductivity, resistance, capacitance, or inductance, to be measured. The conductive layer may be a top layer of the tactile sensing unit such that when a first tactile sensing unit attached to a first finger of an end effector contacts a second tactile sensing unit attached to a second finger of the end effector, the conductive layers of the first and second tactile sensing units come into contact. When the robotic arm end effector engages an item, the item prevents the conductive layers of the tactile sensing units from contacting each other. However, when the robotic arm end effector attempts, but fails to engage an item, the conductive layers of the tactile sensing units contact each other. The conductive layer is coupled to a processor that is able to use the conductive layer to determine one or more continuity values, one or more conductivity values, one or more resistance values, one or more capacitance values, and/or one or more inductance values.

The deformation layer may include a dielectric material (e.g., silicon, plastic, or any other material that is capable of being deformed in response to a force). Measurement objects may be injected into the dielectric material. Nominal sensed values may be determined before the robotic end effector engages an item. When the robotic arm end effector engages an item, sensed values may be compared to the nominal sensed values. The sensed values may be different depending upon whether the end effector successfully or unsuccessfully grasped the item.

In some embodiments, a plurality of magnets are injected into the dielectric material. The plurality of magnets may be arranged in a grid (e.g., 2D grid or 3D grid) or non-grid pattern. One or more magnets may be located on an edge boundary of the dielectric material. The plurality of magnets may be associated with a magnetic sensor located on the substrate layer. The magnetic sensor may detect a nominal magnetic field before the robotic arm end effector engages an item. When the robotic arm end effector engages an item, a force and/or moment associated with the engagement causes one or more of the plurality of magnets to be displaced. This displacement causes a change in magnetic field that is sensed by the magnetic sensor. The magnetic sensor is coupled to a processor, which may use the change in magnetic field to determine a weight value and/or a deformation value.

In some embodiments, a plurality of markers are embedded in the dielectric material. The plurality of markers may be arranged in a grid or non-grid pattern. The grid pattern may be a 2D grid pattern or a 3D grid pattern. The plurality of markers may be associated with an image sensor located on the substrate layer. The image sensor may detect a nominal position for all of the markers before the robotic arm end effector engages an item. When the robotic arm end effector engages an item, a force and/or moment associated with the engagement causes one or more of the plurality of markers to be displaced. This displacement causes a change in marker position that is sensed by the image sensor. The image sensor is coupled to a processor, which may use the change in marker position to determine a weight value and/or a deformation value.

In some embodiments, a reflective material is embedded in the dielectric material and an emitter and receiver are located on the substrate layer. The emitter may transmit a signal that is reflected off the reflective material and the reflected signal is received at the receiver. When the robotic arm end effector engages an item, a force and/or moment associated with the engagement changes how the signal travels through the dielectric material. The engagement causes the amplitude of the reflected signal received at the receiver to change from a nominal signal amplitude. The receiver sensor is coupled to a processor, which may use the change in signal amplitude to determine a weight value and/or a deformation value.

In some embodiments, one or more electro-mechanical sensors capable of detecting deformation (e.g., strain gauge) are embedded in the dielectric material. When the robotic arm end effector engages an item, a force and/or moment associated with the engagement causes a resistance associated with the one or more electro-mechanical sensors to change. The one or more electro-mechanical sensors are coupled to a processor, which may use the change in resistance to determine a weight value and/or a deformation value.

In some embodiments, the dielectric material may include a flexible membrane (e.g., sac, pouch) that contains a gas, air, or a liquid. When the robotic arm end effector engages an item, a force and/or moment associated with the engagement causes a pressure associated with the flexible membrane to change. The pressure may be detected by a pressure sensor and a processor may use the change in pressure to determine a weight value and/or a deformation value.

In some embodiments, the substrate layer is material that is configured to support one or more sensors and electrically connects the one or more sensors to a processor associated with the robotic system.

In various embodiments, upon attempting a grasp a robotic system as disclosed herein performs a static measurement using the one or more sensors to determine whether the robotic arm end effector successfully grasped an item. The static measurement may include the robotic arm end effector grasping the item at rest and measuring the outputs of the one or more sensors. The outputs of the one or more sensors may be compared to corresponding nominal outputs associated with the one or more sensors, i.e., when the robotic arm end effector is not grasping an item, to determine values for one or more factors.

The robotic system may also perform a dynamic measurement using the plurality of sensors to determine whether the robotic arm end effector successfully grasped the item. For example, after an initial grasp, an orientation of the robotic arm end effector may be modified and while the robotic arm end effector is changing the output of the plurality of sensors may be used to determine whether the robotic arm end effector successfully grasped the item.

The one or more tactile sensing units are coupled to a processor. The robotic arm end effector may include other sensors that are also coupled to the processor. For example, a housing that connects the fingers of the robotic arm end effector to the robotic arm (e.g., a "wrist housing") may include one or more sensors that are used to measure force and/or torque. The one or more housing sensors may be used to filter a sensed weight to normalize for the weight of the robotic arm end effector. The sensor output associated with the one or more sensors of the housing may be used to determine one or more factors. The plurality of sensors (e.g., tactile sensing unit sensor(s) and/or housing sensor(s)) provide their corresponding outputs to the processor. The processor may use the sensor outputs to determine one or more forces and/or one or more moments associated with an engagement between the robotic arm end effector and an item. The processor may use the sensor outputs to determine forces and moments associated with each of the tactile sensing units.

The processor may use the sensor outputs to determine corresponding values for a plurality of factors. For example, a sensed weight, a sensed deformation, a sensed continuity, a sensed conductivity, a sensed pressure, a sensed resistance, a sensed inductance, and/or a sensed capacitance may be determined. The plurality of factors are each associated with a coefficient. In some embodiments, the plurality of factors are weighted equally (e.g., they each have an associated coefficient of "1"). In some embodiments, some of the plurality of factors have different weights. For example, the item may be a metal item and the coefficient associated with a continuity factor may be less than the coefficient associated with a deformation factor.

The processor may implement a multi-factor model to determine whether the robotic arm end effector grasped an item. The multi-factor model may be a rule-based model, a predictive model, a machine learning model (e.g., neural network, linear classifier, support vector machine, linear regression, logistic regression, decision tree, deep learning, etc.), etc. In some embodiments, the multi-factor model is configured to output a binary decision regarding whether the robotic arm end effector is engaged with an item (e.g., engaged/non engaged). In some embodiments, the multi-factor model is configured to output a probability of whether the robotic arm end effector is engaged with the item.

The values associated with the plurality of factors and their corresponding coefficients are provided as input to the multi-factor model. The input is applied to the multi-factor model and the robotic system is configured to perform a responsive action based on an output of the multi-factor model. In some embodiments, the robotic system moves the item from the first location to the second location. In some embodiments, the robotic system attempts to re-grasp the item. In some embodiments, the robotic system requests human intervention. In some embodiments, the robotic arm end effector is unable to grasp the item and selects a different item to grasp.

Using tactile sensing units and a multi-factor model enables the robotic system to accurately determine whether the robotic arm end effector successfully grasped an item. The plurality of sensors may provide data points from different points of view that confirm the same conclusion, that is, the robotic arm end effector successfully or unsuccessfully grasped an item. A single factor approach may bias the robotic system in its decision making process. For example, a robotic system may only use continuity between fingers of the robotic arm end effector as a factor. A robotic system may successfully grasp an item, but the item may be conductive. Using continuity as the only factor may cause the robotic system to determine that the item was not successfully grasped. In contrast, using multiple factors provides the robotic system with a balanced approach in its decision making process.

FIG. 1 is a block diagram illustrating a system for picking and placing items in accordance with some embodiments. In the example shown, a robotic system 101 is operating in environment 100. The robotic system 101 includes a plurality of jointed segments comprising a robotic arm 102 mounted on a stationary base 104, an end effector 108, one or more sensors 134, and a controller 106. The robotic arm 102 is coupled to a controller 106 that is configured to manipulate the robotic arm 102 and an end effector 108 mounted on a distal end of robotic arm 102. In some embodiments, controller 106 controls the robotic arm 102 and end effector 108 by providing voltages and/or other signals, inputs, etc. to motors configured at each of the respective joints between rigid elements comprising the robotic arm 102 and/or end effector 108 to cause the respective motors to apply corresponding torque(s) to cause an element coupled to a rotating element of the motor to move relative to an element to which a non-rotating element of the motor is coupled. End effector 108 may include a suction gripper, a parallel gripper, a soft gripper, a dexterous gripper, etc. Robotic system 101 may include a plurality of end effectors and select an end effector that is best suited to grasp the item. For example, an end effector may be selected based on an item's texture. Robotic system 101 may select a parallel gripper instead of a suction gripper in the event the item has too many wrinkled areas.

In the example shown in FIG. 1, the robotic arm 102 is being used to pick up items from a table or other surface 110 (e.g., a workspace area), including in the example shown differently shaped items 112, 114, and 116, and place them on a conveyor belt 118 (e.g., a drop off area). As shown, robotic arm 102 has previously been used to place item 120 on the conveyor belt 118, which is rotating in a direction such that the item 120 is about to fall off the conveyor belt 118 into a destination 122. A workspace area may include a moving platform, such as a conveyor belt or a rotating platform, or a stationary area, in which a pile of items (stable or unstable) are located.

In various embodiments, the "pick and place" operation shown in FIG. 1 is performed by the robotic system 101 comprising robotic arm 102, end effector 108, and controller 106, at least in part in an autonomous mode of operation. For example, in some embodiments the controller 106 and/or one or more other control devices, such as a computer comprising a processor, a memory, and other components, is/are programmed to perform the pick and place operation illustrated in FIG. 1. For example, in some embodiments a programmer or other operator may have programmed or otherwise configured the robotic system 101 to have an awareness of its environment 100 and its position relative to the items on table 110 (or, in some embodiments, a set of coordinates or other locations associate with the table 110, on the one hand, and the conveyor belt 118).

In some embodiments, the robotic system 101 is programmed or otherwise configured to use a library or other repository of strategies to perform the pick and place operation and/or portions thereof. For example, the robotic system 101 may be configured to use awareness of its current position and the environment 100 to position end effector 108 at a location above table 110. Computer vision or other techniques may be used to identify and select an item to pick up next, and a strategy to pick up the item may be selected autonomously, e.g., based on one or more of the item's location, shape, orientation, aspect presented, texture, rigidity, etc.

For example, in the example shown in FIG. 1, the robotic system 101 may have recognized a feature associated with item 112 as having a cube geometry and selected a grasp strategy for cube geometries prior to picking up item 112. The robot may recognize item 114 as having a pyramid geometry and select a grasp strategy for pyramid geometries. The robot may recognize item 116 as having a cylindrical geometry and select a grasp strategy for cylindrical geometries.

Environment 100 includes a plurality of cameras, such as cameras 115, 117. Although FIG. 1 depicts environment 100 having two cameras, environment 100 may include n cameras where n is a number greater than one. The plurality of cameras may be wired to or wirelessly coupled to the robotic system 101. In some embodiments, at least one of the plurality of cameras is at a fixed location. In some embodiments, at least one of the plurality of cameras is dynamically moving (e.g., attached to a moving object, such as a drone). In some embodiments, at least one of the plurality of cameras is capable of being stationary and moved to a different location (e.g., detect an item at a first location, move the camera to a second location, and detect the item at the second location). In some embodiments, different lighting conditions are used in environment 100 to detect changes in perceived surface features of one or more items.

Using a plurality of cameras enables the robotic system 101 to view environment 100 from different vantage points. This prevents items from being obscured and gives more accurate estimates of the item geometries and item boundaries. For example, a large item may be placed in such a way that it prevents a camera from seeing a smaller item next to the large item. Using a plurality of cameras from different locations enables the smaller item to be seen and boundary information associated with the smaller item to be determined. A large workspace area may not be covered by a single camera. The views associated with a plurality of cameras may be merged to give the robotic system 101 a more complete view of the workspace area 110. In the event one of the cameras is blocked, the robotic system 101 is still able to pick and place items.

In some embodiments, the robotic system 101 segments items based on a point cloud generated by one or more of the plurality of cameras. Robotic system 101 can segment the items based on the RBG or multi-spectrum camera image (e.g., a combination of RGB, Depth, and/or Infrared, etc.). The segmented objects can be deprojected into a point cloud so that potential graspable areas can be determined. This provides additional information, such as item type, expected weight/material, preferred grasp strategy, etc., that is not available when segmenting an item based on point cloud information alone. This combined segmenting strategy works well when picking items that are difficult to distinguish with depth alone (e.g., small boxes that are tightly packed together could look like a single plane as a point cloud), but using image segmentation combined with point cloud information, robotic system 101 can identify each box and extract the box from the input.

In some embodiments, the robotic system 101 autonomously picks and places unknown items from table 110 (e.g., a workspace area) to conveyor belt 118 (e.g., a drop off area). The robotic system 101 may determine that items 112, 114, 116 are located on table 110 through the use of cameras 115, 117. Controller 106 determines geometry information based on visual data (e.g., point cloud data) received from cameras 115, 117. Controller 106 selects corresponding potentially graspable features for items 112, 114, 116 that correspond to the geometry information determined from the visual data received from cameras 115, 117. For example, based on the visual data received from cameras 115, 117, controller 106 may determine that item 112 includes a graspable feature that corresponds to a cube shape, item 114 includes a graspable feature that corresponds to a pyramid shape, and item 116 includes a cylindrical shape. Controller 106 may select a graspable feature that most closely resembles a geometric object within a threshold amount. For example, controller 106 may compare the determined geometry information with a library of known features and select a feature for the item based on the comparison. In some embodiments, the features are canonical shapes. Controller 106 may superimpose the canonical shapes on the items to be grasped.

To determine one or more graspable features associated with an item, controller 106 may randomly cut planes of an item to decompose the item into a plurality of sub-segments. The item may be cut at planes with minimum occupancy of data points of a point cloud (related to grasping a pointy feature at the top of an item). Planes of an item may be cut based on strong gradients in color or appearance of the item. In some embodiments, a membership function is used to determine if there are outliers in a point cloud within a generic generated sub-region. An additional cutting plane may be added or the item may be split in segregate areas with high residuals. The sub-segments may be processed separately. For example, outlier detection techniques may be applied to the sub-segments. In some embodiments, a 5-sigma fits a Gaussian distribution to the points and identifies points that are 5-sigma (standard deviation) away from the mean, and marks the identified points as outliers. In some embodiments, a subsampling method is used on the point cloud and refit to a mean. The points are then used to find points that are a certain distance away from the mean.

In some embodiments, sub-segments of an item are determined based on a reach of end effector's 108 interaction with the item. For example, if end effector 108 is unable to grasp across a wide item, then controller 108 determines not to grasp the item around the wide portion of the item. If a suction gripper end effector is being used, then a relatively smooth flat surface is sought out. Void-based picking strategies or minimum occupancy cutting planes may be avoided. Primitives are re-fit to the new partitioned cloud. The process may repeat iteratively until some level of quality or recursion limit is met.

Controller 106 may determine negative space information (e.g., voids) associated with an item based on the visual data received from cameras 115, 117. For example, controller 106 may determine that a handle of a coffee mug includes negative space or that a car tire includes negative space. Computer vision algorithms using the data from the plurality of cameras may determine voids (e.g., holes) in items, such as cups, mugs, rolled up wire, tape, etc. In the event a void is detected, an item may be grasped by inserting a gripper into the void and picking the item from a side wall of the item.

Controller 106 may determine the curvature of an item that is going to be picked based on the visual data received from cameras 115, 117. In the event controller 106 determines that the item is curved, controller 106 may change a control strategy associated with placing an item, such that the curved item is placed more carefully and more slowly ungripped to prevent the item from rolling away when placed. In the event the visual data received from cameras 115, 117 indicates that a placed item is rolling or moving after a grip of the item is initially released, controller 106 may re-grip the item and try to settle the item before the grip is released again. In the event controller 106 attempts to grip/re-grip the item more than a threshold number of times, a warning may be provided to user 130 and alert user 130 that the item may roll away.

Controller 106 determines corresponding features associated with item 112, 114, 116 based on the visual data received from cameras 115, 117. For example, controller 106 may determine that an item includes a handle. The visual data received from cameras may be used to determine a minimum boundary associated with an item and a maximum boundary associated with the item. A boundary of the item includes a height, width, or depth associated with the item. The visual data may provide data that allows one or more of the boundaries of the item to be determined. For example, a first camera may be facing an item at a first angle. The first camera may be able to provide information regarding a height and width of the item, but is unable to provide depth information of the item. A second camera may be facing the item at a second angle. The second camera may be able to provide information regarding a depth and height of the item, but unable to provide information regarding a width of the item. Controller 106 may merge the visual data received from the plurality of cameras to determine boundary information (estimated, approximate, or exact) associated with an item. For example, controller 106 may determine the height and width of an item, but not the depth. Controller 106 may determine that the depth of the item is within a certain range of values.

A minimum boundary associated with an item corresponds to a minimum value that an item may have in a particular dimension. A maximum boundary associated with an item corresponds to a maximum value that an item may have in a particular dimension. For example, the first camera may detect a first item and a second item behind the first item. Controller 106 may determine that the second item is 12 inches behind the first item based on the visual data from the first camera. The maximum value that the first item may have in the depth dimension is 12 inches in the event the first item and the second item are touching. The minimum value that the first item may have in the depth dimension is a threshold minimum size for the dimension (e.g., ⅛ inch, ¼ inch, ½ inch, 1 inch, etc.). The threshold minimum size may be based on historically known items, known items with similar dimensions, context of items, type of items, etc.

Controller 106 is associated with a memory (not shown) that stores a data structure that associates grasping strategies with features. A grasping strategy may include a grasping technique and how to grasp a feature using the grasping technique. In some embodiments, a grasping strategy includes grasping a major and minor axes of a bounding box that can be fit to the geometric estimate of object/segment. In some embodiments, a grasping strategy includes cutting the item/segment estimate at some Z-height and recalculating a bounding box. The major and minor axes of the recalculated bounding box may then be grasped. This is useful when an item has a wide base but a small tower somewhere in the middle and the robotic system wants to accurately grasp the tower. The memory also stores instructions on how to perform the grasping techniques. The instructions may include instructions to partially pre-close a gripper if required to avoid impacting other items. The memory also stores instructions on how to perform the placing techniques. The instructions may include instructions to partially open gripper fingers of end effector 108 so that end effector 108 does not disrupt other items while placing the item at a drop off area. The memory also stores information regarding an end effector's mechanism and geometry (e.g., parallel gripper vs suction gripper, width/length of the gripper fingers, etc.).

A grasping technique may be associated with one or more features. For example, a suction technique may be used for items with a graspable feature that corresponds to a pyramidal shape, a graspable feature that corresponds to a cube shape, or a graspable feature that corresponds to a rectangular prism shape. A parallel gripping technique may be used for items with a graspable feature that corresponds to a spherical shape. A feature may be associated with one or more grasping techniques. For example, a parallel gripping technique or a scooping technique may be used for a graspable feature that corresponds to a spherical shape. Different types of grippers may be used to grasp a feature having a particular shape. For example, a first grasping technique may use a parallel gripper and a second grasping technique may use a suction gripper. In some embodiments, the types of grippers are autonomously switched between gripper types during a pick and place operation. A grasping technique may be used at different portions of a feature. For example, a parallel gripping technique may be used on a top, middle, or bottom portion of a feature. Controller 106 determines corresponding scores for each of the grasping strategies associated with a feature. In some embodiments, an item is associated with a plurality of features. Controller 106 may determine one or more grasping techniques for each of the plurality of features and determine corresponding scores for the determined grasping techniques.

A score associated with a grasping strategy may be based on a probability that the grasping strategy will result in a successful grasp of the feature. The probability that the grasping strategy will result in a successful grasp of the feature may be based on one more factors, such as contextual information about the environment, historical grasp information for the environment, an angle at which a robotic arm is to grasp the feature (to avoid collision with other items), a height at which a robotic arm is to grasp the feature (to prevent collision at the top of the gripper), grip width, orientation of surface normal at grasp points, the amount of the feature that is capable of being grasped, material properties, etc. Contextual information about the environment includes the existence of other items near or adjacent to the item, the amount that the other items near or adjacent to the item hinder an ability of a robotic arm to grasp the feature, whether more items are continuously being added to a workspace area, etc. Material properties may include a center of mass of an item, a friction property of the item, color, reflectivity, etc. For example, robotic system 101 may build a large supporting surface so that a large item can be placed with stability. When robotic system 101 detects that an item could slid off a tilted placement support surface given the friction coefficients of the item and the placement support surface, robotic system 101 may be configured to only choose to pick items with high enough coefficients of friction (e.g., to avoid sliding).

Controller 106 selects one of the grasping strategies based on the corresponding scores associated with each of the grasping strategies. The items may be a heterogeneous collection of items that are placed in a cluttered pile. Items may vary in size, color, height, geometry, texture, stiffness, etc. Items are individually removed from the pile. Some of the items are at least partially occluded. All items in the cluttered pile are unknown a priori. Controller 106 selects the grasping strategy with the highest score. In the event two or more grasping strategies have the same high score, controller 106 selects one of the grasping strategies, picks the feature associated with the grasping strategy, moves the item to a drop off area, and then selects a remaining item associated with the other grasping strategies.

Controller 106 causes end effector 108 to grasp a feature associated with an item. In the example shown, controller 106 has caused end effector 108 to grasp item 112. Controller 106 may leverage prior knowledge about the gripper mechanism and geometry to simplify the grasp prediction problem. For example, if end effector 108 will approach an item, such as item 112 from above, controller 106 analyzes the top section of a point cloud to identify graspable protrusions. In some embodiments, as the robotic system moves, cameras 115, 117 collect more data (e.g., closer, different angles, different lighting, reflectivity, etc.) and the robotic system 101 adjusts how it causes end effector 108 to grasp an item based on the new data.

Grasp points for an item may be determined using a meshified or segmented version of the item. A close approximation of the item to be grasp is built and a model matching with a library or a machine learning method is used to determine an optimal grasp location for the item. The grasp points are ranked. Controller 106 causes end effector 108 to grasp an item at one of the grasp points.

In various embodiments, end effector 108 includes one or more tactile sensing units (not shown) as disclosed herein. The system uses sensed values from the tactile sensing unit(s) to determine whether an item was successfully grasped. The tactile sensing unit includes one or more sensors. Each of the one or more sensors is configured to provide an output that reflects a sensed value associated with engagement of end effector 108 with an item, such as item 112. The one or more of sensor outputs are used to determine one or more factors indicative of engagement of end effector 108 with an item.

The one or more sensors may include one or more of magnetic sensors, optical sensors, electromechanical sensors, pressure sensors, strain gages, force sensors, conductivity sensors, current sensors, voltage sensors, capacitance sensors, resistance sensors, inductance sensors, infrared sensors, temperature sensors, etc. The one or more factors may include weight, deformation, continuity, conductivity, pressure, resistance, inductance, capacitance or any other factor that is indicative of robotic arm end effector engagement.

The one or more tactile sensing units are coupled to controller 106. End effector 108 may include other sensors that are also coupled to the controller 106. For example, a housing that connects the fingers of end effector 108 to robotic arm 102 may include one or more sensors that are used to measure force and/or torque. The plurality of sensors (tactile sensing unit sensor(s) and/or housing sensor(s)) provide their corresponding outputs to controller 106. Controller 106 may use the sensor outputs to determine one or more forces and/or one or more moments associated with an engagement between end effector 108 and an item, such as item 112. Controller 106 may use the sensor outputs to determine forces and moments associated with each of the tactile sensing units.

Controller 106 may use the sensor outputs to determine corresponding values for the plurality of factors. For example, a sensed weight, a sensed amount of deformation, a sensed conductivity, a sensed pressure, a sensed resistance, a sensed inductance, and/or a sensed capacitance may be determined. The plurality of factors are each associated with a coefficient. In some embodiments, the plurality of factors are weighted equally (e.g., they each have an associated coefficient of "1"). In some embodiments, some of the plurality of factors have different weights. For example, the selected item may be a metal object and the coefficient associated with a conductivity factor may be less than the coefficient associated with a deformation factor.

Controller 106 may implement a multi-factor model to determine whether the robotic arm end effector grasped an item. The multi-factor model may be a rule-based model, a predictive model, machine learning model (e.g., neural network, linear classifier, support vector machine, linear regression, logistic regression, decision tree, deep learning, etc.), etc. In some embodiments, the multi-factor model is configured to output a binary decision regarding whether end effector 108 is engaged with an item (e.g., engaged/non engaged. In some embodiments, the multi-factor model is configured to output a probability of whether end effector 108 is engaged with the item.

The corresponding values associated with the plurality of factors and their corresponding coefficients are provided as input to the multi-factor model. The input is applied to the multi-factor model and robotic system 101 is configured to perform a responsive action based on an output of the multi-factor model. In some embodiments, robotic system 101 moves the selected item from table 110 to conveyor belt 118. In some embodiments, robotic system 101 attempts to re-grasp the selected item. In some embodiments, robotic system 101 requests human intervention. In some embodiments, end effector 108 is unable to grasp the selected item and selects a different item to grasp.

End effector 108 moves an item, in this example item 112, to a drop off area, such as conveyor 118. End effector 108 places the item in the drop off area. The robotic system 101 may use the plurality of cameras to place the item at a location near where the robotic system 101 thinks the item should be placed. The robotic system 101 may lower the item at the drop of location and detect when the robot system 101 feels the force of the drop off area push back against it. In some embodiment, robotic system 101 uses the mechanical vibrations at the impact between the bottom of an item and the drop off area to feel the force of the drop off area push back against it. When the robotic system 101 detects that the drop off area has been reached, the robotic system 101 opens end effector 108 or stops suction to place the item down gently. While opening end effector 108, the robotic system 101 may move up or down to control the placement force (sometimes opening the gripper while in contact can crush items). This enables the robotic system 101 to stack items or to dynamically adjust placement height when the placement surface height estimate is error prone or unknown. This also helps when other items are in the way. In some embodiments, robotic system 101 determines whether any items that may roll away are placed in a drop off area. In the event there are no items that might roll away, controller 106 may control the robotic arm 102 and end effector 108 to push items already in drop off area closer together so that space is created to place one or more other items. In the event there are items that might roll away or tip over, controller 106 may control the robotic arm 102 and end effector 108 to rotate the item and place the stable supporting surface of the item onto the drop off area.

In various embodiments, the robotic system 101 automatically prompts intervention by teleoperation. In some embodiments, if in the course of performing the pick and place operation shown in FIG. 1 the robotic system 101 reaches a state in which the robotic system 101 cannot determine a (next) strategy to (further) perform the operation, the robotic system 101 prompts a remote operator (in this example) to assist via teleoperation.

In the example shown, controller 106 is connected via network 124 to a teleoperation computer 126. In some embodiments, teleoperation computer 126 may be involved in operation of the robotic system 101 in the autonomous mode, e.g., by communicating high level instructions to controller 106 via network 124. In various embodiments, one or both of the controller 106 and teleoperation computer 126 may prompt an intervention by teleoperation, e.g., if the robotic system 101 reaches a state in which it does not have a strategy available to perform (complete) a next task or step in the operation.

For example, referring further to FIG. 1, if item 114 were dropped and landed on one of its flat sides, in an orientation that presented a triangular aspect to the robot, in some embodiments the robotic system 101 may not have a strategy available to pick up the item 114 and/or may have timed out or exhausted a configured number of attempts to pick up the item 114. In response, teleoperator 130 may be prompted to intervene through teleoperation, and may use the manual input device 128 to control operation of the robot. For example, teleoperator 130 may manipulate the robotic system 101 to pick up the item 114 and place the item on the conveyor belt 118. Or, teleoperator 130 may use the robotic system 101 to change the orientation of the item 114 to one in which the autonomous robotic system 101 would be expected (or be more likely) to have a strategy available to pick up the item 114.

In some embodiments, robotic system 101 monitors the teleoperation and updates the multi-factor model based on the teleoperation. For example, the sensors associated with robotic system 101 (e.g., the tactile sensing unit sensor(s) and/or housing sensor(s)) may output values during teleoperation. In the event a teleoperation grasp attempt results in a successful grasp of an item, the robotic system may learn of sensor output values that are indicative of a successful grasp and use those learned values for subsequent autonomous grasps to determine whether an item was successfully grasped. In the event a teleoperation grasp attempt results in an unsuccessful grasp of an item, the robotic system may learn of sensor output values that are indicative of an unsuccessful grasp and use those learned values for subsequent autonomous grasps to determine whether an item was not successfully grasped. Teleoperation may be performed a plurality of instances. Over the plurality of instances, the robotic system may learn a range of sensor output values that are indicative of a successful grasp and a range of sensor output values that are indicative of an unsuccessful grasp. Corresponding ranges may be learned for different types, shapes, and/or sizes of items.

In the example shown, teleoperation may be performed through manipulation of a manual input device 128, e.g., a haptic input device, by a human operator 130. The human operator 130 (sometimes referred to as a teleoperator) may be prompted by information displayed via a display device comprising and/or associated with the teleoperation computer 126 to begin teleoperation. Data from one or more sensors 134 may be provided to the human operator 130 via network 124 and teleoperation computer 126. In some embodiments, sensors 134 include a camera on the robot (not shown) or cameras 115, 117 and are configured to generate a video feed that is displayed to the teleoperator 130 and used to perform and/or complete performance of an operation or portion thereof via teleoperation. In various embodiments, the camera is connected with a low-latency, high throughput connection, including by way of example and without limitation one or more of analog RF based communication, WiFi, Bluetooth, and Sub GHz. In some embodiments, a mix of cameras of different types is used. For example, cameras with different communication rates, bandwidth, and/or other characteristics may be used, such as two RGB visual cameras, four depth cameras, two IR cameras, etc.

In various embodiments, teleoperation may be performed using a variety of different sensors 134. In some embodiments, these may guide the robotic system 101 in determining whether it is "stuck", and/or may simplify the teleoperation. In some embodiments, sensors help transition the teleoperation modality from direct haptic controls to increasingly abstract executive commands (such as clicking an object to pick with a mouse, or saying "open shelf" to an audio transcription device).

Examples of sensors 134 used in various embodiments include digital switches that are configured to detect interactions and specific "stuck" scenarios with the environment, and/or the presence of unknown agents in the vicinity of the robotic system 101 (or teleoperator). Further examples include force or pressure sensors on the hand or robot that determine success or failure of operations such as grasps. After some series of failures, the robotic system 101 determines it is "stuck." Another example is one or more sensors, such as position sensors on the robot joints, which may be used by the robotic system 101 to know whether the planned and/or otherwise expected movement trajectory is being followed precisely. When it is not following the expected trajectory precisely, likely it has made contact with the environment 100 and the robotic system 101 may be programmed to conclude it has gotten "stuck" and needs to invoke human intervention.

A vision system that includes the plurality of cameras is configured to keep track of each item in a workspace area through multi modal means (e.g., RGB instance tracking, RGB feature matching, RGB optical flow, point cloud matching, etc.) and utilize methods, such as Hungarian pair matching, to keep track of the items that robotic system 101 is to pick. Robotic system 101 is configured to estimate the states of each tracked item, such as velocity, potential to fall/slide away, and trajectory of motion. Robotic system 101 may use other known information, such as current speed and size of the conveyance systems and sensors 134 to update the item states with higher accuracy. The determined item states may be used by robotic system 101 to make informed decisions about where and what items to pick, and where/when/how to place the items. For example, robotic system 101 may select more stable items to pick (grasp) and possibly pick (even while moving) from an estimated item location in the future to compensate for movement time of robotic arm 102 and a velocity of a moving item. Robotic system 101 may place an item onto a moving platform drop-off area more steadily without dropping and causing the item to roll by placing the item with an initial velocity as estimated from environment 100. Robotic system 101 may also choose collision free zones to place items in drop-off area 118. The collision zones may be determined from estimated trajectories of tracked items. Using the data associated with the plurality of cameras, robotic system 101 is able to understand the shape of the grasped item and environment 100. This enables robotic system 101 to intelligently plan trajectories that will avoid collisions between the picked items and environment 100.

In some embodiments, a plurality of robotic systems are working together to pick and place items. Using a plurality of robotic systems may increase the overall throughput of the system.

Figure 2:
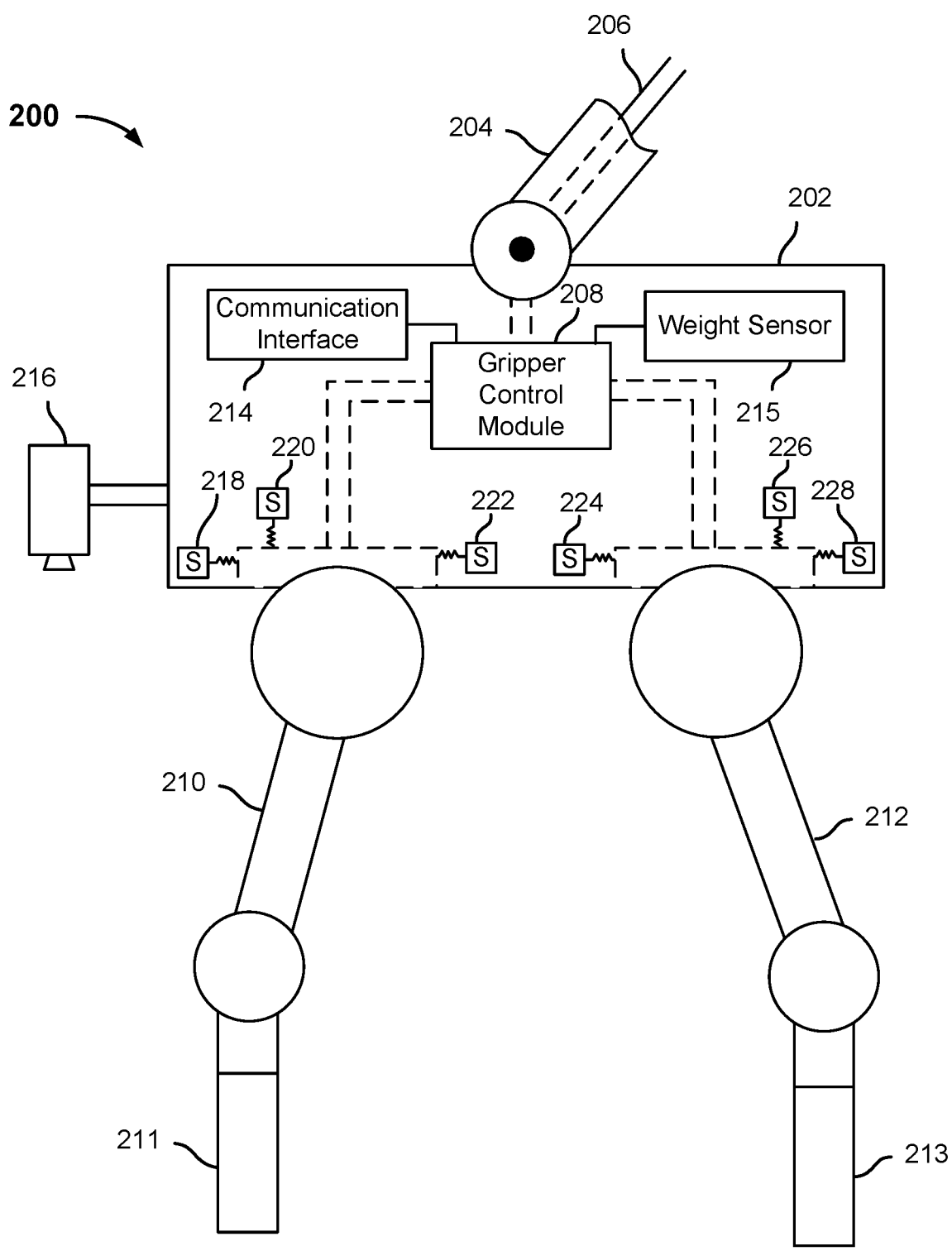
FIG. 2 is a block diagram illustrating a robotic arm end effector in accordance with some embodiments.

FIG. 2 is a block diagram illustrating a robotic arm end effector in accordance with some embodiments. In various embodiments, end effector 200 may be used to implement end effector 108 of FIG. 1.

In the example shown, end effector 200 includes a body or housing 202 attached to robotic arm 204 via a rotatable coupling. In some embodiments, the connection between housing 202 and robotic arm 204 may comprise a motorized joint controlled by a control computer, such as controller 106 of FIG. 1. End effector 200 further includes a gripper comprising articulating digits 210 and 212 and a power line 206 that runs through the robotic arm 204 into the housing 202 to supply electrical power to gripper control module 208. In various embodiments, control module 208 is connected, e.g., via wireless and/or wired communication through communication interface 214 to a control computer external to end effector 200, e.g., controller 106 of FIG. 1. The control module 208 includes electronic and/or electromechanical elements operable to manipulate the gripper digits 210, 212, e.g., to grasp an item to be picked up, moved, and placed using end effector 200.

In the example shown, a camera 216 mounted on the side of housing 202 provides image data of a field of view below the end effector 200. A plurality of force sensors 218, 220, 222, 224, 226, and 228 measure force applied to the mount points of digits 210 and 212, respectively. In various embodiments, the force measurements are communicated via communication interface 214 to an external and/or remote control computer. The sensor readings are used in various embodiments to enable the robotic arm 204 and end effector 200 to be used to snug an item into place adjacent to other items and/or sidewalls or other structures, and/or to detect instability (e.g., insufficient push back with the item is pressed down upon while still under suction but in the place in which the item was expected to be placed and to be stable).

In some embodiments, sensors are used to detect collisions with other items, the receptacle, and/or the environment, and to continue automated operation by "compliant" adjustment of the trajectory. For example, if a wall or other structure is bumped into, in some embodiments, the robotic arm reduces force and adjusts the trajectory to follow along the obstacle until it is clear of it.

Weight sensor 215 may be a force sensor, a load cell, or any other sensor that is capable of detecting a force that is directly or indirectly applied to housing 202. Weight sensor 215 may be configured to measure rotational and/or directional torque. Weight sensor 215 may be configured to measure a force and a moment when the end effector 200 engages an item.

Tactile sensing units 211, 213 are associated with articulating digits 210, 212, respectively. In some embodiments, tactile sensing units 211, 213 are attached to digits 210, 212, respectively. In some embodiments, tactile sensing units 211, 213 are included in a sensing covering that is placed over end effector 200 such that each of the digits 210, 212 has a corresponding tactile sensing unit 211. The sensing covering may cover digits 210, 212, as well as housing 202. In some embodiments, tactile sensing units 211, 213 are the same type of tactile sensing units. In some embodiments, tactile sensing units 211, 213 are different types of tactile sensing units. For example, digit 210 may be associated with the tactile sensing unit depicted in FIG. 3B and digit 212 may be associated with the tactile sensing unit depicted in FIG. 3E.

Figure 3A:
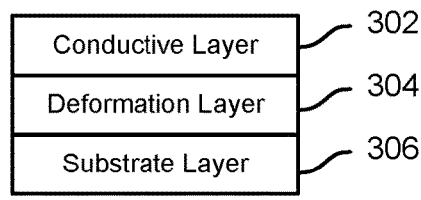
FIG. 3A is a block diagram illustrating a tactile sensing unit in accordance with some embodiments.

FIG. 3A is a block diagram illustrating a tactile sensing unit in accordance with some embodiments. In the example shown, tactile sensing unit 300 may be implemented as a tactile sensing unit, such as tactile sensing unit 211 or tactile sensing unit 213.

Tactile sensing unit 300 includes a conductive layer 302, a deformation layer 304, and a substrate layer 306. In some embodiments, conductive layer 302, deformation layer 304, and substrate layer 306 are planar layers. In some embodiments, conductive layer 302, deformation layer 304, and substrate layer 306 are curved layers. Tactile sensing unit 300 is coupled to a processor (not shown). In some embodiments, conductive layer 302 or substrate layer 306 are optional. In some embodiments, conductive layer 302 and deformation layer 304 are combined into a single layer.

Conductive layer 302 may include conductive material that enables continuity or other electrical properties, such as conductivity, resistance, capacitance, or inductance, to be sensed. For example, conductive layer 302 may be a top layer of a tactile sensing unit such that when a first tactile sensing unit attached to a first finger contacts a second tactile sensing unit attached to a second finger, the conductive layers of the first and second tactile sensing units come into contact. Before a grasp operation, a nominal continuity value, a nominal conductivity value, a nominal resistance value, a nominal capacitance value, and/or a nominal inductance value may be determined. During a grasping operation, the end effector may use its fingers to grasp an item and the processor may transmit an electrical signal to a first tactile sensing unit to determine one or more continuity values, one or more conductivity values, one or more resistance values, one or more capacitance values, and/or one or more inductance values. In some embodiments, the electrical signal varies in frequency. The one or more determined continuity values, the one or more determined conductivity values, the one or more determined resistance values, the one or more determined capacitance values, or the one or more determined inductance values may indicate that the end effector grasped or did not grasp the item.

The processor may compare a determined continuity value to the nominal continuity value. In the event the determined continuity value changes from the nominal continuity value by a threshold amount, the determined continuity value may indicate that the end effector did not grasp the item. In the event the determined continuity value does not change from the nominal continuity value by the threshold amount, the determined continuity value may indicate that the end effector grasped the item.

The processor may compare a determined conductivity value to the nominal conductivity value. In the event the determined conductivity value changes from the nominal conductivity value by a threshold amount, the determined conductivity value may indicate that the end effector did not grasp the item. In the event the determined conductivity value changes from the associated nominal value less than the threshold amount, the determined conductivity value may indicate that the end effector grasped the item.

The processor may compare a determined resistance value to the nominal resistance value. In the event the determined resistance value changes from the nominal resistance value by a threshold amount, the determined resistance value may indicate that the end effector did not grasp the item. In the event the determined resistance value changes from the associated nominal value less than the threshold amount, the determined resistance value may indicate that the end effector grasped the item.

The processor may compare a determined capacitance value to the nominal capacitance value. In the event the determined capacitance value changes from the nominal capacitance value by a threshold amount, the determined capacitance value may indicate that the end effector did not grasp the item. In the event the determined capacitance value changes from the nominal capacitance value less than the threshold amount, the determined capacitance value may indicate that the end effector grasped the item. The processor may also determine a material of the grasped item based on the determined capacitance value.

The processor may compare a determined inductance value to the nominal inductance value. In the event the determined inductance value changes from the nominal inductance value by a threshold amount, the determined inductance value may indicate that the end effector did not grasp the item. In the event the determined inductance value changes from the associated nominal value less than the threshold amount, the determined inductance value may indicate that the end effector grasped the item.

Deformation layer 304 may include a dielectric material (e.g., silicon, plastic, or any other material that is capable of being deformed in response to a force). Measurement objects may be injected into the dielectric material. For example, a plurality of magnets may be injected into the dielectric material.

Substrate layer 306 may include one or more sensors that are configured to sense a change associated with the measurement objects that are injected into deformation layer 304. For example, substrate layer 306 may include a magnetic sensor that is configured to sense a change in magnetic field when the plurality of magnets of deformation layer 304 are displaced. In some embodiments, substrate layer 306 is a finger associated with a robotic arm end effector. In some embodiments, substrate layer 306 is material that is configured to support one or more sensors and electrically connects the one or more sensors to a processor associated with the robotic system.

Figure 3B:
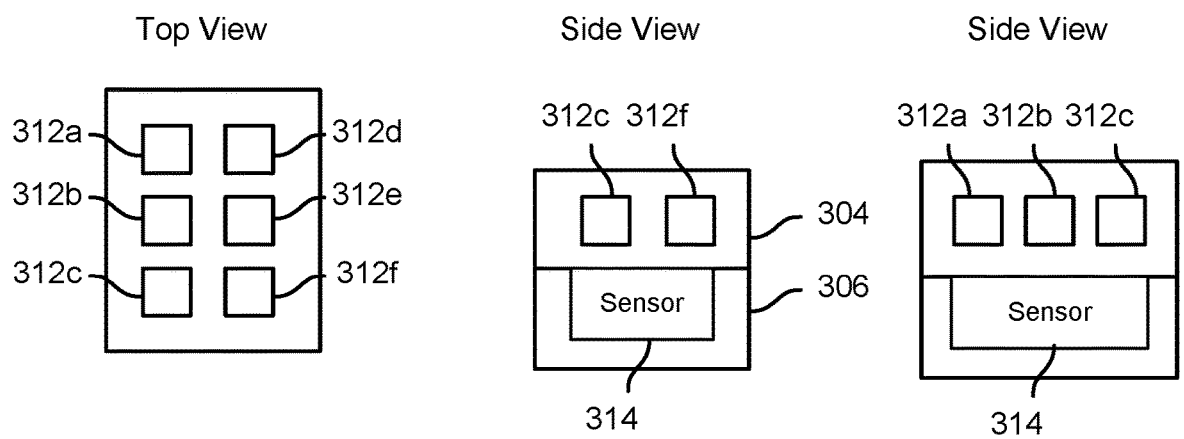
FIG. 3B is a diagram of illustrating a tactile sensing unit from different points of view in accordance with some embodiments.

FIG. 3B is a diagram of illustrating a tactile sensing unit from different points of view in accordance with some embodiments. In the example shown, the different points of view 310 illustrate a top view and two side views of a tactile sensor unit. A conductive layer of the tactile sensing unit is not shown for explanation purposes.

In the example shown, the deformation layer of the tactile sensing unit includes a plurality of measurement objects. In some embodiments, the plurality of measurement objects are magnets. In some embodiments, the plurality of measurement objects are markers. The plurality of measurement objects may be arranged in a grid or non-grid pattern. The grid pattern may be a 2D m×n grid pattern or a 3D l×m×n grid pattern. Measurement objects may be located on an edge boundary of the deformation layer 304.

In the example shown, measurement objects 312a, 312b, 312c, 312d, 312e, 312f are arranged in a 2×3 grid. Although six measurement objects are shown, x measurement objects may be injected into the deformation layer. The number of measurement objects that may be injected into the deformation layer may be based on an acceptable amount of cross talk between the measurement objects. For example, as the number of measurement objects in the deformation layer increases, the amount of crosstalk between the measurement objects also increases. The acceptable amount of crosstalk may be specified by an operator associated with the robotic system.

The plurality of measurement objects are associated with a sensor 314 located in substrate layer 306. In the event the plurality of measurement objects are magnets, sensor 314 is a magnetic sensor. In the event the plurality of measurement objects are markers, sensor 314 is an image sensor. In some embodiments, a measurement object is associated with one sensor. In some embodiments, a measurement object is associated with a plurality of sensors.

Before a grasp operation, a nominal magnetic field for the plurality of magnets or a nominal position for each of the markers may be determined. When the robotic arm end effector engages an item, a force and/or moment associated with the engagement causes one or more of the plurality of measurement objects to be displaced. This displacement causes a change in a measurable value that the sensor 314 is configured to sense. For example, in the event the plurality of measurement objects are magnets, sensor 314 may sense a change in a magnetic field associated with the plurality of magnets. A processor may be coupled to the magnetic sensor and compare the sensed magnetic field to the nominal magnetic field. The sensed magnetic field may be different depending on whether the robotic arm end effector successfully or unsuccessfully grasped the item. The processor may determine a weight value and/or a deformation value based on comparison. In the event the plurality of measurement objects are markers, sensor 314 may sense a change in position associated with one or more of the plurality of markers. The change in position may be different depending on whether the robotic arm end effector successfully or unsuccessfully grasped the item. A processor may be coupled to the image sensor and compare the sensed positions of the plurality of markers to the nominal positions of the plurality of markers to determine a weight value and/or a deformation value.

Figure 3C:
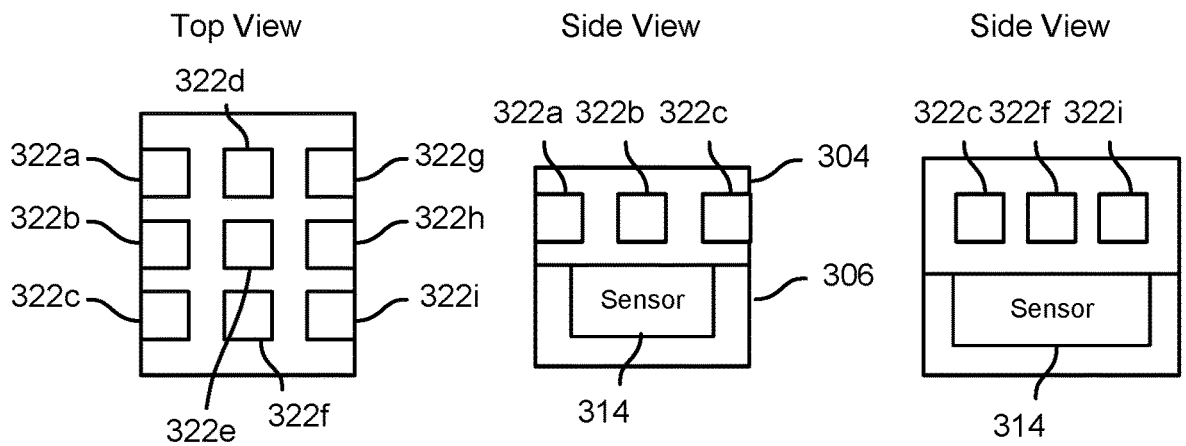
FIG. 3C is a diagram illustrating a tactile sensing unit from different points of view in accordance with some embodiments.

FIG. 3C is a diagram illustrating a tactile sensing unit from different points of view in accordance with some embodiments. In the example shown, the different points of view 320 illustrate a top view and two side views of a tactile sensor unit. A conductive layer of the tactile sensing unit is not shown for explanation purposes.

In the example shown, the measurement objects embedded in deformation layer 304 are magnets. The tactile sensing unit of FIG. 3C is similar to the tactile sensing unit of FIG. 3B except that a subset of the measurement objects (322a, 322b, 322c, 322g, 322h, 322i) are located on the sides of the deformation layer. A magnitude of the magnetic field associated with the measurement objects 322a, 322b, 322c, 322d, 322e, 322f, 322g, 322h, 322i that is sensed by sensor 314 may depend on a depth associated with deformation layer 304 and a distance between the measurement objects and sensor 314. Locating a subset of the measurement objects on the sides of the deformation layer may increase the magnitude of the magnetic field associated with measurement objects 322a, 322b, 322c, 322d, 322e, 322f, 322g, 322h, 322i that is sensed by sensor 314.

Figure 3D:
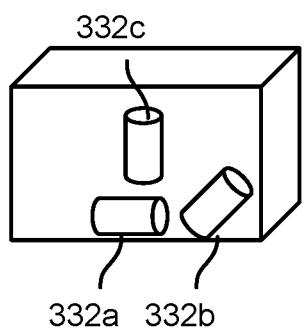
FIG. 3D is a diagram illustrating an example of a magnetic sensor in accordance with some embodiments.

FIG. 3D is a diagram illustrating an example of a magnetic sensor in accordance with some embodiments. Magnetic sensor 330 may be implemented as a sensor, such as sensor 314. In the example shown, magnetic sensor 330 includes coils 332a, 332b, 332c. Coil 332a is configured to measure a magnetic field in the x-axis direction. Coil 332b is configured to measure a magnetic field in the y-axis direction. Coil 332c is configured to measure a magnetic field in the z-axis direction. Magnetic sensor 330 may be coupled to a plurality of magnets, such as the magnets depicted in FIGS. 3B, 3C. A displacement of at least one of the magnets causes a change in the magnetic field detected by magnetic sensor 330. Magnetic sensor 330 is configured to detect a change of the magnetic field in the x-axis direction, the y-axis direction, and the z-axis direction.

Figure 3E:
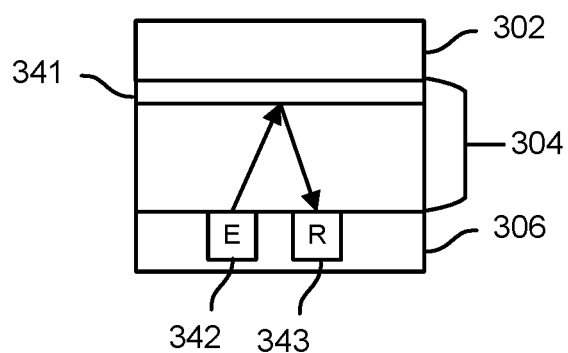
FIG. 3E is a diagram illustrating a tactile sensing unit in accordance with some embodiments.

FIG. 3E is a diagram illustrating a tactile sensing unit in accordance with some embodiments. Tactile sensing unit 340 may be implemented as a tactile sensing unit, such as tactile sensing unit 211, 213. In the example shown, a reflective material 341 is embedded in deformation layer 304. Emitter 342 (e.g., light emitting diode emitter) and receiver 343 are located on substrate layer 306. Emitter 342 may transmit a signal that is reflected off reflective material 341 and the reflected signal is received at receiver 343. A nominal amplitude of the signal received at receiver 343 may be determined when a robotic arm end effector is not engaged with an item. When the robotic arm end effector engages an item, a force and/or moment associated with the engagement changes how the signal travels through deformation layer 304. For example, the amplitude of the signal received at receiver 343 may increase or decrease due to reflection, refraction, and/or dispersion of the signal within deformation layer 304. A processor may be coupled to the receiver and compare the nominal signal amplitude to the received signal amplitude to determine a weight value and/or a deformation value.

Figure 3F:
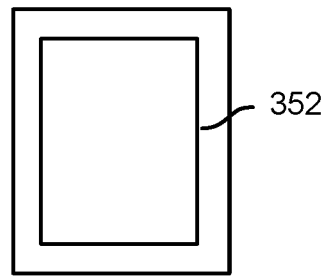
FIG. 3F is a diagram illustrating a tactile sensing unit in accordance with some embodiments.
Figure 3F:
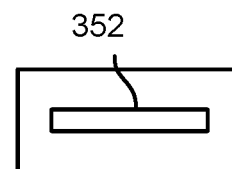

FIG. 3F is a diagram illustrating a tactile sensing unit in accordance with some embodiments. Tactile sensing unit 350 may be implemented as a tactile sensing unit, such as tactile sensing unit 211, 213. In the example shown, a conductive layer and a substrate layer of the tactile sensing unit are not shown for explanation purposes.

Tactile sensing unit 350 includes an electro-mechanical sensor 352 capable of detecting deformation (e.g., strain gauge) are embedded in the dielectric material. A nominal resistance associated with electro-mechanical sensor 352 may be determined when a robotic arm end effector is not engaged with an item. When the robotic arm end effector engages an item, a force and/or moment associated with the engagement causes a resistance associated with electro-mechanical sensor 352 to change. A processor may be coupled to the one or more electro-mechanical sensors and compare the nominal resistance value to the changed resistance value to determine a weight value and/or a deformation value.

Figure 3G:
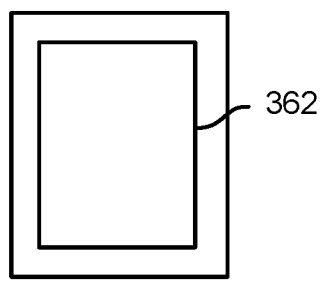
FIG. 3G is a diagram illustrating a tactile sensing unit in accordance with some embodiments.
Figure 3G:
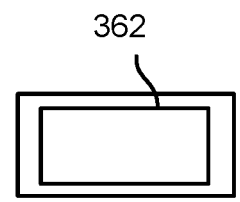

FIG. 3G is a diagram illustrating a tactile sensing unit in accordance with some embodiments. Tactile sensing unit 360 may be implemented as a tactile sensing unit, such as tactile sensing unit 211, 213. In the example shown, a conductive layer and a substrate layer of the tactile sensing unit are not shown for explanation purposes.

The deformation layer of tactile sensing unit 360 includes a flexible membrane 362 (e.g., sac, pouch) that contains air, a gas, or liquid. A nominal pressure associated with flexible membrane 362 may be determined when a robotic arm end effector is not engaged with an item. When the robotic arm end effector engages an item, a force and/or moment associated with the engagement causes a pressure associated with flexible membrane 362 to change. A processor may be coupled to the flexible membrane and compare the nominal pressure value to the changed pressure value to determine a weight value and/or a deformation value.

Figure 4:
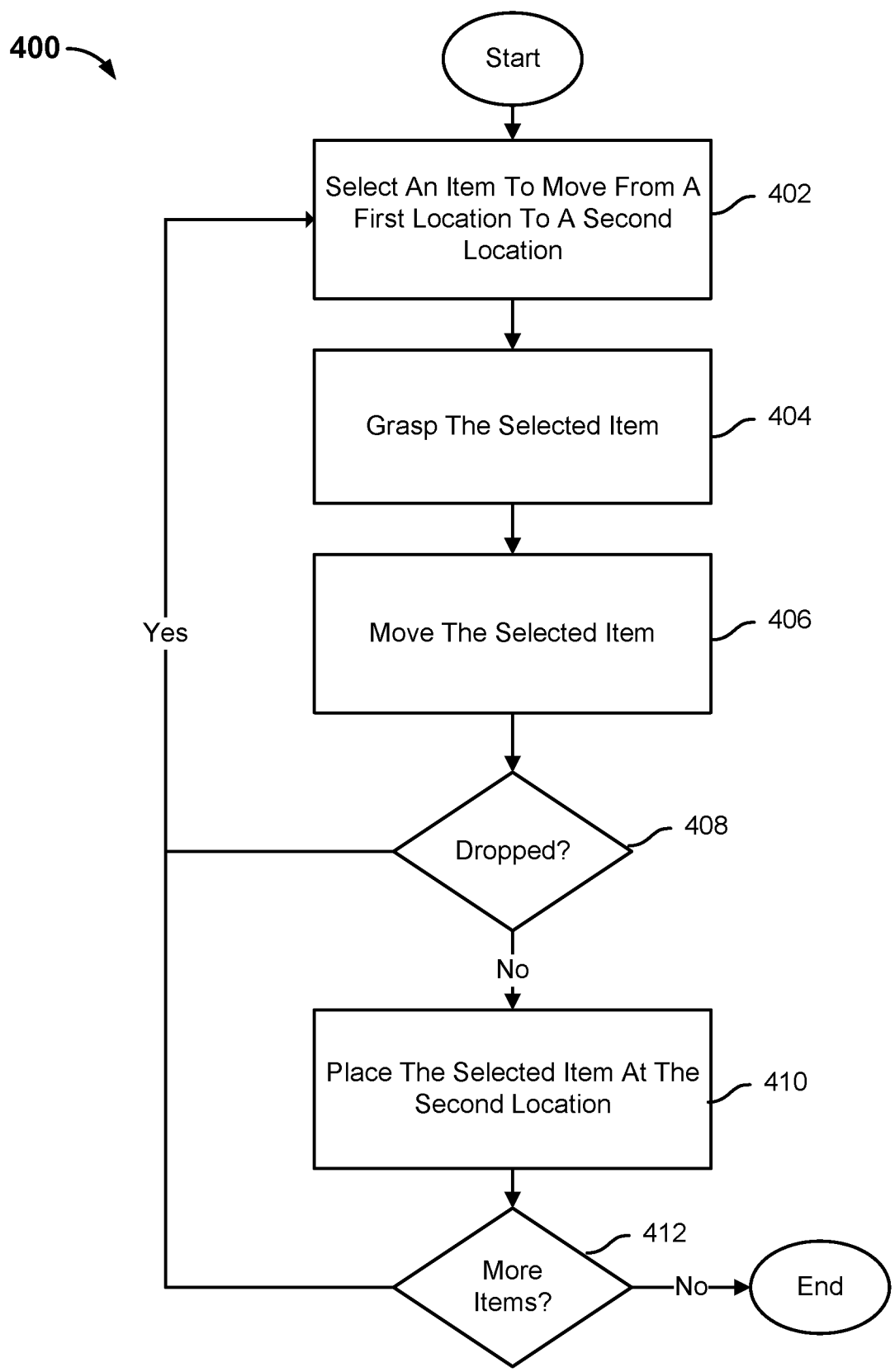
FIG. 4 is a flow chart illustrating a process for picking and placing an item in accordance with some embodiments.

FIG. 4 is a flow chart illustrating a process for picking and placing an item in accordance with some embodiments. In the example shown, process 400 may be implemented by a robotic system, such as robotic system 101.

At 402, an item is selected to be moved from a first location to a second location. A first location, such as a workspace area, may include one or more items. A robotic environment may include a plurality of cameras that are configured to view and detect the one or more items from different vantage points. In some embodiments, one or more of the cameras generate one or more point clouds of the one or more items. In the event a plurality of point clouds are generated, the plurality of point clouds are merged together. In various embodiments, the one or more items may include a plurality of items placed in a cluttered pile, a plurality of items that are spaced apart, and/or a plurality of items one or more of which is obscured from view by one or more other items of the plurality of items.

Geometry information is determined for each of the plurality of items. Geometry information may be determined based on point cloud information obtained from data associated with one or more of the plurality of cameras. Corresponding geometry information associated with each of the plurality of features may be compared to a library of geometries for which grasp strategies are known. A strategy associated with a geometry that most closely resembles the geometry of a determined feature, e.g., within a similarity threshold, may be selected. In some embodiments, an item is associated with a single feature (e.g., a roll of paper towel corresponds to a cylinder). In some embodiments, an item is split into a plurality of sub-segments (also referred to as sub-objects herein) and corresponding features for each of the plurality of sub-segments are determined (e.g., a golf club includes a body segment and a head segment).

Items that are near edges of a workspace area or corners may have physical or other limitations about where and/or how the item is to be picked. In some embodiments, a non-optimal, but feasible pick angle may be selected depending on the environment boundaries associated with an item. A wider longitudinal may be selected over a narrower latitudinal grasp because the wider longitudinal grasp may keep the end effector within the environmental bounds.

Corresponding scores of a successful grasp are determined for each of the determined grasp strategies. For example, a gripping tool, such as end effector 200, may be used to grasp an item at a top portion, middle portion, or bottom portion of an item. A score of a successful grasp of a feature may be based on a probability that the grasping strategy will result in a successful grasp. Probabilities are determined for the different combinations of gripping tools (in embodiments where multiple tools are available) and grasping locations. The probability that the grasping strategy will result in a successful grasp of the item may be based on one more grasping factors, such as contextual information about the environment, historical grasp information for the environment, an angle at which a robotic arm is to grasp the item (to avoid collision with other items), a height at which a robotic arm is to grasp the item (to prevent collision at the top of the gripper), grip width, orientation of surface normal at grasp points, the amount of the item that is capable of being grasped, etc. Contextual information about the environment includes the existence of other items near or adjacent to the item, the amount that the other items near or adjacent to the item hinder an ability of a robotic arm to grasp the item, whether more items are continuously being added to a workspace area, etc.

One of the determined grasp strategies is selected to be attempted based on the determined corresponding scores. The items or features, and corresponding grasping strategies are ranked based on the corresponding scores. The item or feature with the highest score among the plurality of items and features is selected to be grasped. In the event a plurality of potential grasps have the same score, one of the plurality of grasps is selected. After the grasped item has been moved, one of the other grasps having the same score is selected.

In the event an item from the plurality of items has been selected, grasped, moved, and placed in a drop off area, the grasp with the next highest score is selected to be attempted.

At 404, the selected item is grasped. An end effector of the robotic system engages the selected item. The end effector may include a plurality of fingers. Each of the plurality of fingers may be associated with a corresponding tactile sensing unit. The tactile sensing unit may include a plurality of sensing layers. Each of the sensing layers may include one or more sensors. When engaged with an item, each of the sensing layers of the tactile sensing unit may output a corresponding sensed value that is different from a nominal sensed value (e.g., when the robotic arm end effector is not engaged with an item).

The robotic system performs a static measurement using the plurality of sensors to determine whether the robotic arm end effector successfully grasped an item. The static measurement may include the robotic arm end effector grasping the item at rest and measuring the outputs of the plurality of sensors. The robotic system may also perform a dynamic measurement using the plurality of sensors to determine whether the robotic arm end effector successfully grasped the item. For example, after an initial grasp, an orientation of the robotic arm end effector may modified and the output of the plurality of sensors may be measured while the robotic arm end effector is moving to determine whether the robotic arm end effector successfully grasped the item.

The one or more tactile sensing units are coupled to a processor. The processor may use the sensor outputs to determine one or more forces and/or one or more moments associated with an engagement between the robotic arm end effector and an item. The sensor outputs (tactile sensing unit sensor(s) and/or housing sensor(s)) may be used to determine corresponding values for the plurality of factors. For example, a sensed weight, a sensed amount of deformation, a sensed continuity, a sensed conductivity, a sensed pressure, a sensed resistance, a sensed inductance, and/or a sensed capacitance may be determined.

The plurality of factors are each associated with a coefficient. In some embodiments, the plurality of factors are weighted equally (e.g., they each have an associated coefficient of "1"). In some embodiments, some of the plurality of factors have different weights. For example, the selected item may be a metal object and the coefficient associated with a continuity factor may be less than the coefficient associated with a deformation factor.

The processor may implement a multi-factor model to determine whether the robotic arm end effector grasped an item. The multi-factor model may be a rule-based model, a predictive model, a machine learning model machine learning model, etc. In some embodiments, the multi-factor model is configured to output a binary decision regarding whether the robotic arm end effector is engaged with an item (e.g., engaged/non engaged. In some embodiments, the multi-factor model is configured to output a probability of whether the robotic arm end effector is engaged with the item. The corresponding values associated with the plurality of factors and their corresponding coefficients are provided as input to the multi-factor model and the robotic system is configured to perform a responsive action based on an output of the multi-factor model.

At 406, the selected item is moved. The selected item is moved in response an output of the multi-factor model indicating that the end effector grasped the selected item. At 408, it is determined whether or not the item associated with the selected grasp has been dropped while moving the item from the workspace area to the drop off area. The item may be determined to have been dropped based on one or more sensor measurements (e.g., pressure, force, capacitance, etc.) of the one or more tactile sensor units associated with the end effector of the robotic system. The sensor measurement may be compared to a threshold value to determine whether the item has been dropped. In the event the item has been dropped, process 400 returns to 402. In the event the item has not been dropped, process 400 proceeds to 410.

At 410, the selected item is placed at the second location. Items may be placed in a manner that prevents the end effector from colliding with boundaries associated with the second location.

In some embodiments, the item is placed in a clutter with other items at the second location. The robotic system may randomly place the item at the second location. The robotic system may then use a force sensor on the end effector to gently place the item on the clutter without causing the robotic system to perform a protective stop. The robotic system may tightly pack items into boxes at the second location by using the force sensor to realize a tight slotting strategy.

In some embodiments, the item is placed spaced apart from other items at the second location. The robotic system may divide a placement space at the second location into a plurality of subareas and place the selected item in one of the subareas. There may be a buffer area between each of the subareas. In some embodiments, the buffer area is adjustable.

In some embodiments, a vision system associated with the robotic system is configured to determine how to place the item down. For example, some items are not rigid and the extents associated with an item (e.g., a cloth or a cuddly toy) change after the item has been grasped and moved. The vision system is configured to determine what the extents are and the material information to choose how to place the item down to prevent crushing it and from dropping it from a height that might damage the item or cause the item to fall into a tangled or unfavorable configuration.

At 412, it is determined whether there are more items to be moved. Visual data from one or more cameras of the robotic system may be used to determine whether there are more items to be moved. In the event there are more items to be moved, process 400 returns to 402. In the event there are no more items to be moved, process 400 ends.

Figure 5:
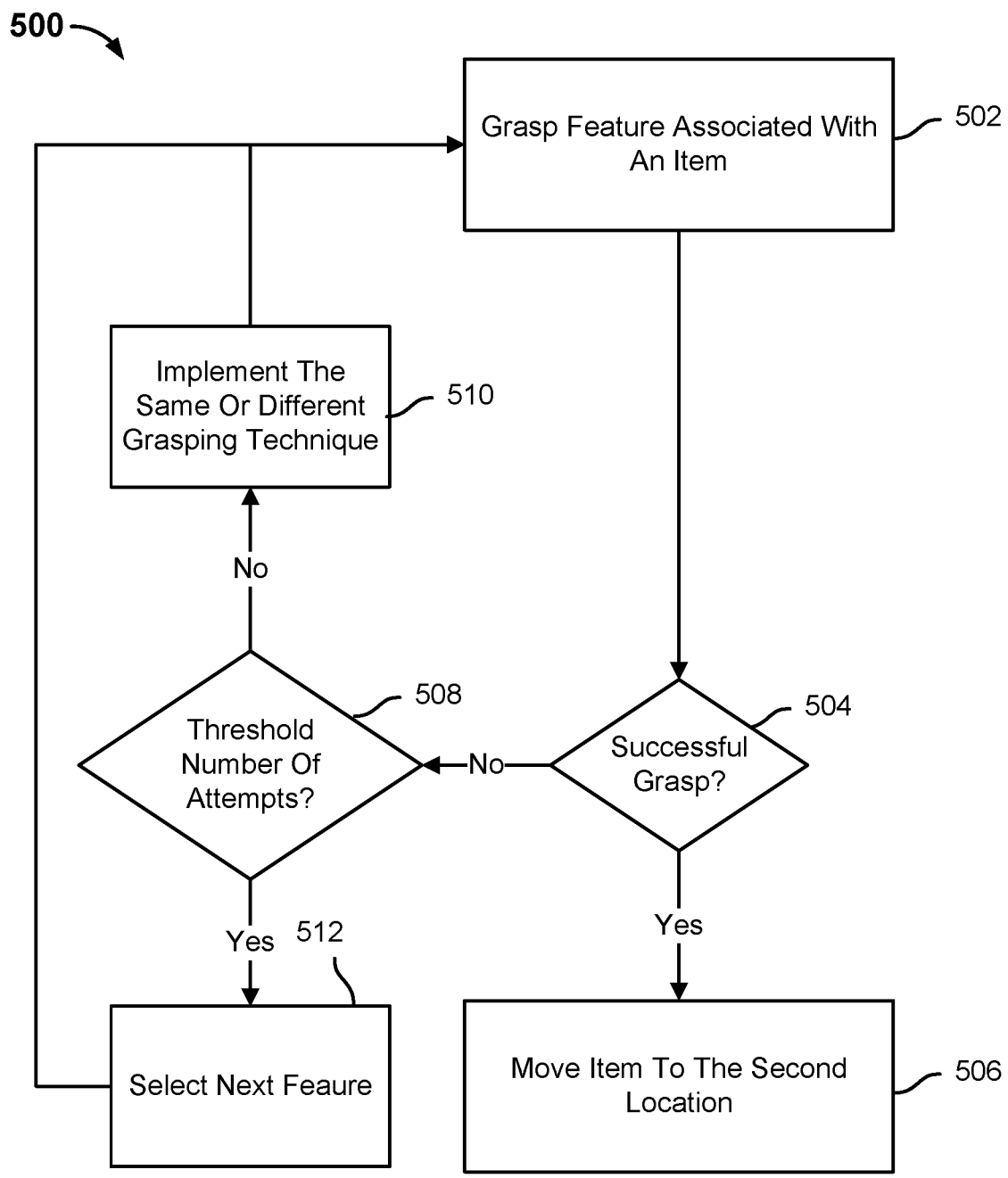
FIG. 5 flow chart illustrating a process for grasping an item in accordance with some embodiments.

FIG. 5 flow chart illustrating a process for grasping an item in accordance with some embodiments. In some embodiments, process 500 is implemented by a robotic system, such as robotic system 101. In some embodiments, process 500 is implemented to perform some or all of steps 404 and 406 of process 400.

At 502, a feature associated with an item is grasped. A controller of a robotic system causes an end effector to grasp a feature associated with the item. The end effector may include one or more tactile sensing units. The feature associated with the item may be grasped at a determined optimal grasp location. The optimal grasp location may be determined using a meshified or segmented version of the item that is determined from visual data received from one or more cameras of the robotic system.

In some embodiments, visual and/or tactile information is used to detect an item's texture, such as wrinkledness. A robotic system may use the visual and/or tactile information to choose high-quality pick points (e.g., probability of a successful grasp greater than a threshold), such as avoiding using a suction gripper to pick an item at a wrinkled area.

At 504, it is determined whether or not the grasp is successful. The output from one or more tactile sensing units are used to determine one or more forces and/or one or more moments associated with an engagement between the robotic arm end effector and an item. The sensor outputs from the one or more tactile sensing units and/or one or more housing sensors may be used to determine corresponding values for the plurality of factors. The plurality of factors are each associated with a coefficient. A multi-factor model may be implemented to determine whether the robotic arm end effector successfully grasped an item. The corresponding values associated with the plurality of factors and their corresponding coefficients are provided as input to the multi-factor model and the multi-factor model is configured to output a decision. In some embodiments, the multi-factor model is configured to output a binary decision regarding whether the robotic arm end effector is engaged with an item (e.g., grasped/not grasped.) In some embodiments, the multi-factor model is configured to output a probability of whether the robotic arm end effector is grasped with the item.

In the event the grasp is successful, process 500 proceeds to 506 and the item is moved to the second location. In the event the grasp is not successful, process 500 proceeds to 508 and it is determined whether a threshold number of grasp attempts have been performed. In the event a threshold number of grasp attempts have been performed, process 500 proceeds to 512. In the event a threshold number of grasp attempts have not been performed, process 500 proceeds to 510.

At 510, the same grasping technique or a different grasping technique is implemented. A feature of an item may be associated with a plurality of grasping techniques. Each of the grasping techniques is associated with a corresponding score. The grasping technique of the plurality of grasping techniques having the highest score is initially selected. In the event that grasping technique failed, the grasping technique with the next highest score may be implemented. In some embodiments, the same grasping technique is tried again.

At 512, a next feature is selected. A plurality of items with a plurality of features may be located in a workspace area. Each of the plurality of features have a corresponding score of a successful grasp. Features are selected based on their corresponding scores. A next feature is selected based on its corresponding score. In some embodiments, the next feature is associated with a different item. In some embodiments, the next feature is associated with the same item. The next feature has a lower score than the previous selected feature, but has the same or higher score than other remaining features of the plurality of features.

Figure 6:
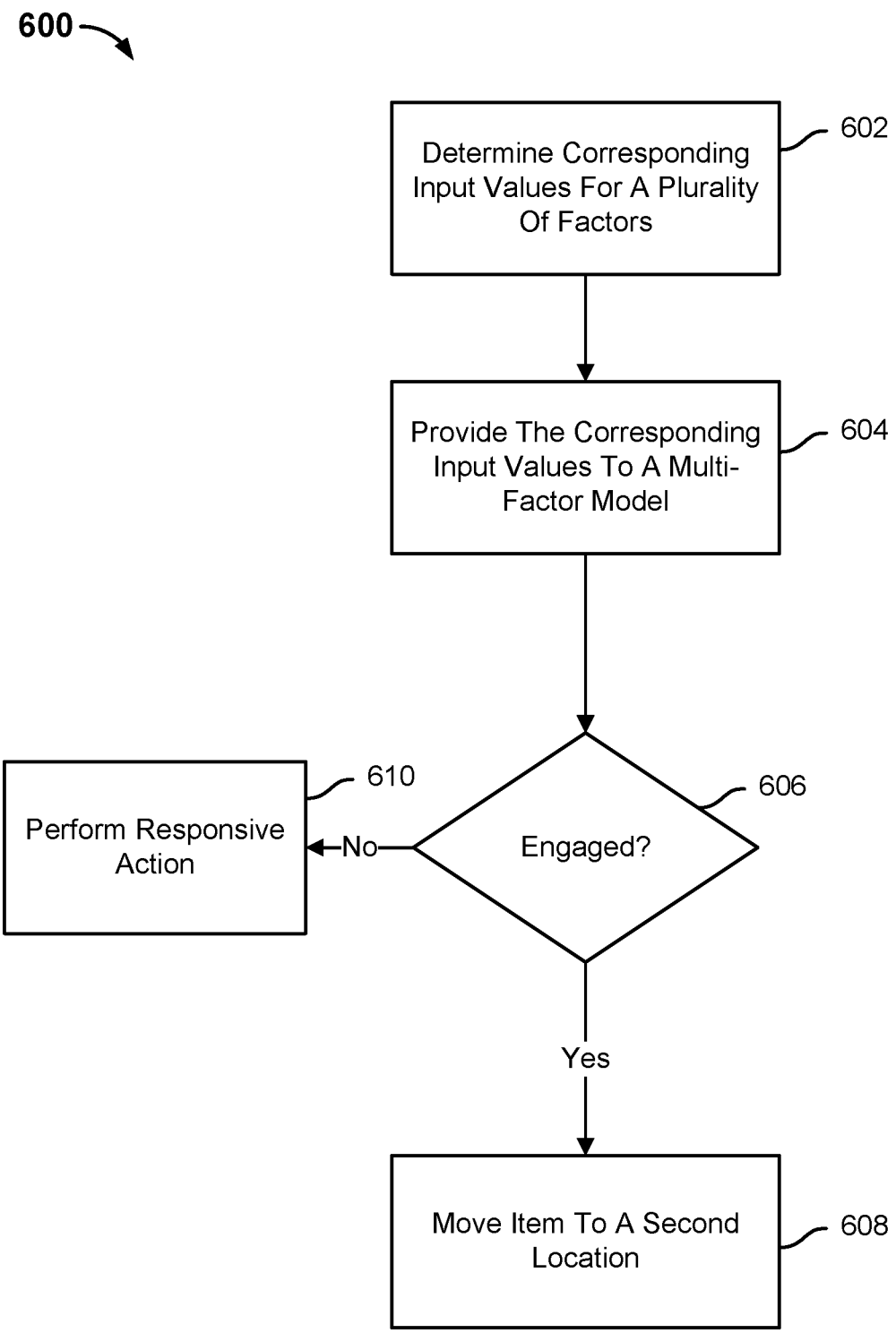
FIG. 6 is a flow chart illustrating a process for determining whether an item has been successfully grasped in accordance with some embodiments.

FIG. 6 is a flow chart illustrating a process for determining whether an item has been successfully grasped in accordance with some embodiments. In some embodiments, process 600 is implemented by a robotic system, such as robotic system 101. In some embodiments, process 600 is implemented to perform some or all of step 404 of process 400 or steps 504 of process 500.

At 602, corresponding input values for a plurality of factors are determined. The plurality of factors may include weight, deformation, continuity, conductivity, pressure, resistance, inductance, capacitance or any other factor that is indicative of robotic arm end effector engagement.

An end effector of a robotic system may include a plurality of fingers. Each of the plurality of fingers may be associated with a corresponding tactile sensing unit. The tactile sensing unit may include a plurality of sensing layers.

The tactile sensing unit may include a conductive layer, a deformation layer, and a substrate layer. Each of the sensing layers may include one or more sensors. When engaged with an item, each of the sensing layers of the tactile sensing unit may output a corresponding sensed value that is different from a nominal sensed value (e.g., when the robotic arm end effector is not engaged with an item).

The conductive layer may include conductive material that enables electrical property factors such as continuity, conductivity, resistance, capacitance, or inductance, to be sensed. The conductive layer may be a top layer of the tactile sensing unit such that when a first tactile sensing unit attached to a first finger contacts a second tactile sensing unit attached to a second finger, the conductive layers of the first and second tactile sensing units come into contact.

Before a grasp operation, a nominal continuity value, a nominal conductivity value, a nominal resistance value, a nominal capacitance value, or a nominal inductance value may be determined. During a grasping operation, the end effector may use its fingers to grasp an item and the processor may transmit an electrical signal to a first tactile sensing unit to determine one or more continuity values, one or more conductivity values, one or more resistance values, one or more capacitance values, or one or more inductance values. In some embodiments, the electrical signal varies in frequency. The one or more determined continuity values, the one or more determined conductivity values, the one or more determined resistance values, the one or more determined capacitance values, or the one or more determined inductance values may indicate that the end effector grasped or did not grasp the item.

A determined continuity value may be compared to the nominal continuity value. In the event the determined continuity value changes from the nominal continuity value by a threshold amount, the determined continuity value may indicate that the end effector did not grasp the item. In the event the determined continuity value does not change from the nominal continuity value by a threshold amount, the determined continuity value may indicate that the end effector grasped the item.

A determined conductivity value may be compared to the nominal conductivity value. In the event the determined conductivity value changes from the nominal conductivity value by a threshold amount, the determined conductivity value may indicate that the end effector did not grasp the item. In the event the determined conductivity value changes from the associated nominal value less than a threshold amount, the determined conductivity value may indicate that the end effector grasped the item.

A determined resistance value may be compared to the nominal resistance value. In the event the determined resistance value changes from the nominal resistance value by a threshold amount, the determined resistance value may indicate that the end effector did not grasp the item. In the event the determined resistance value changes from the associated nominal value less than a threshold amount, the determined resistance value may indicate that the end effector grasped the item.

A determined capacitance value may be compared to the nominal capacitance value. In the event the determined capacitance value changes from the nominal capacitance value by a threshold amount, the determined capacitance value may indicate that the end effector did not grasp the item. In the event the determined capacitance value changes from the nominal capacitance value less than a threshold amount, the determined capacitance value may indicate that the end effector grasped the item. The processor may also determine a material of the grasped item based on the determined capacitance value.

A determined inductance value may be compared to the nominal inductance value. In the event the determined inductance value changes from the nominal inductance value by a threshold amount, the determined inductance value may indicate that the end effector did not grasp the item. In the event the determined inductance value changes from the associated nominal value less than a threshold amount, the determined inductance value may indicate that the end effector grasped the item.

The deformation layer may include a dielectric material (e.g., silicon, plastic, or any other material that is capable of being deformed in response to a force) that enables a weight factor and/or a deformation factor to be determined. Measurement objects may be injected into the dielectric material.

In some embodiments, a plurality of magnets are injected into the dielectric material and a magnetic sensor is located on the substrate layer. Before a grasp operation, a nominal magnetic field may be determined. During a grasp operation, a force and/or moment associated with the engagement causes one or more of the plurality of magnets to be displaced. This displacement causes a change in magnetic field that is sensed by the magnetic sensor. A processor may be coupled to the magnetic sensor and compare the sensed magnetic field to the nominal magnetic field. The processor may determine a weight value and/or a deformation value based on comparison.

In some embodiments, a plurality of markers are embedded in the dielectric material and an image sensor located on the substrate layer. Before a grasp operation, a nominal position for each of the markers may be determined. During a grasp operation, a force and/or moment associated with the engagement causes one or more of the plurality of markers to be displaced. A processor may be coupled to the image sensor and compare the sensed positions of the plurality of markers to the nominal positions of the plurality of markers to determine a weight value and/or a deformation value.

In some embodiments, a reflective material is embedded in the dielectric material and an emitter and receiver are located on the substrate layer. Before a grasp operation, a nominal signal amplitude may be determined. During a grasp operation, a force and/or moment associated with the engagement changes how the signal travels through the dielectric material. The engagement causes the amplitude of the reflected signal received at the receiver to change. A processor may be coupled to the receiver and compare the nominal signal amplitude to the received signal amplitude to determine a weight value and/or a deformation value.

In some embodiments, one or more electro-mechanical sensors capable of detecting deformation (e.g., strain gauge) are embedded in the dielectric material. Before a grasp operation, a nominal resistance value may be determined. During a grasp operation, a force and/or moment associated with the engagement causes a resistance associated with the one or more electro-mechanical sensors to change. A processor may be coupled to the one or more electro-mechanical sensors and compare the nominal resistance value to the changed resistance value to determine a weight value and/or a deformation value.

In some embodiments, the dielectric material may include a flexible membrane (e.g., sac, pouch) that contains air, a different gas, or liquid. Before a grasp operation, a nominal pressure value may be determined. During a grasp operation, a force and/or moment associated with the engagement causes a pressure associated with the flexible membrane to change. A processor may be coupled to the flexible membrane and compare the nominal pressure value to the changed pressure value to determine a weight value and/or a deformation value.

At 604, the corresponding input values are provided to a multi-factor model. The processor may use the sensor outputs to determine one or more forces and/or one or more moments associated with an engagement between the robotic arm end effector and an item. The processor may also use the sensor outputs to determine corresponding values for the plurality of factors. For example, a weight value, a deformation value, a continuity value, a conductivity value, a pressure value, a resistance value, an inductance value, and/or a capacitance value may be determined.

The plurality of factors are each associated with a coefficient. In some embodiments, the plurality of factors are weighted equally (e.g., they each have an associated coefficient of "1"). In some embodiments, some of the plurality of factors have different weights. For example, the selected item may be a metal object and the coefficient associated with a continuity factor may be less than the coefficient associated with a deformation factor.

The processor may implement a multi-factor model. The factor values and corresponding coefficients may be inputted to the multi-factor model.

At 606, it is determined whether a robotic arm end effector is engaged with an item. In some embodiments, the multi-factor model is configured to output a binary decision regarding whether the robotic arm end effector is engaged with an item (e.g., engaged/non engaged. In some embodiments, the multi-factor model is configured to output a probability of whether the robotic arm end effector is engaged with the item.

In the event an output of the machine learning model indicates that the robotic arm end effector is engaged with the item, process 600 proceeds to 608 where the item is moved to a second location. In the event an output of the machine learning model indicates the robotic arm end effector did not engage the item, process 600 proceeds to 610 where one or more responsive actions are performed. In some embodiments, the robotic system attempts to re-grasp the selected item. In some embodiments, the robotic system requests human intervention. In some embodiments, the robotic arm end effector is unable to grasp the selected item and selects a different item to grasp.

Figure 7:
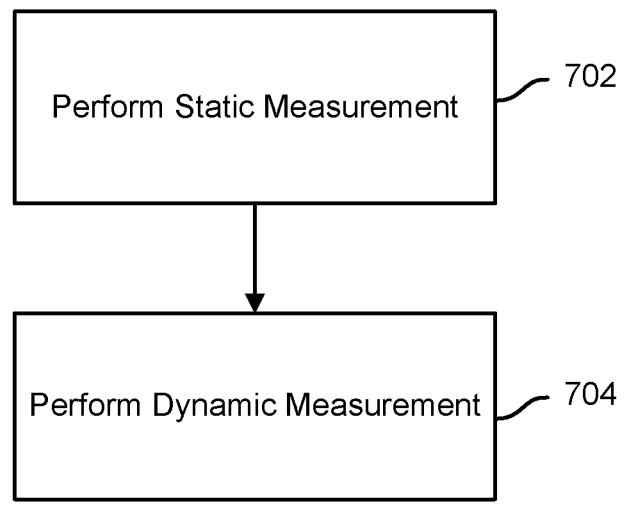
FIG. 7 is a flow chart illustrating a process for determining whether an item has been successfully grasped in accordance with some embodiments.

FIG. 7 is a flow chart illustrating a process for determining whether an item has been successfully grasped in accordance with some embodiments. In some embodiments, process 700 is implemented by a robotic system, such as robotic system 101. In some embodiments, process 700 is implemented to perform some or all of step 404 of process 400, step 504 of process 500, or step 606 of process 600.

At 702, a static measurement is performed. The static measurement may include the robotic arm end effector grasping the item at rest and measuring the outputs of the plurality of sensors. In some embodiments, the outputs of the plurality of sensors may be compared to corresponding nominal outputs associated with the plurality of sensors, i.e., when the robotic arm end effector is not grasping an item, to determine whether the robotic arm end effector successfully grasped the item.

In some embodiments, expected sensor outputs for a successful grasp during a static measurement are learned. During a learning phase, a human operator or the robotic system may grasp and move items of different types. The robotic system may ascertain the combination of sensor outputs that are indicative of a successful grasp and the combinations of sensor outputs that are indicative of an unsuccessful grasp. The outputs of the plurality of sensors may be compared to the expected sensor outputs for a successful grasp to determine whether the robotic arm end effector successfully grasped the item.

At 704, a dynamic measurement is performed. After an initial grasp, an orientation of the robotic arm end effector may be modified and the output of the plurality of sensors may be measured while the robotic arm end effector is moving to determine whether the robotic arm end effector successfully grasped the item. The outputs of the plurality of sensors when performing the static measurement may be compared to the outputs of the plurality of sensors when performing the dynamic measurement to determine whether the robotic arm end effector successfully grasped the item.

In some embodiments, expected sensor outputs for a successful grasp during a dynamic measurement are learned. During a learning phase, a human operator or the robotic system may grasp and move items of different types. The items may be moved in different directions and/or orientations. The robotic system may ascertain the combination of sensor outputs that are indicative of a successful grasp and the combinations of sensor outputs that are indicative of an unsuccessful grasp. The outputs of the plurality of sensors may be compared to the expected sensor outputs for a successful grasp to determine whether the robotic arm end effector successfully grasped the item.

In some embodiments, during runtime, the robotic system determines whether the robotic arm end effector successfully grasped the item based on a combination of the sensor outputs associated with the static measurement and/or the sensor outputs associated with the dynamic measurement.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic system, comprising:
a tactile sensing unit that includes a plurality of sensors, each of the plurality of sensors configured to provide an output that reflects a sensed value associated with engagement of a robotic arm end effector with an item, the plurality of sensors including a first sensor configured to measure a first value associated with a first factor indicative of engagement and a second sensor configured to measure a second value associated with a second factor indicative of engagement, wherein the first and second factors are different, wherein the tactile sensing unit is comprised of a plurality of layers, wherein an intermediate layer of the plurality of layers includes a plurality of measurement objects that are embedded in a material associated with the intermediate layer and a layer below the intermediate layer includes the first sensor, wherein the first sensor is configured to measure a value associated with the plurality of measurement objects that are embedded in the material associated with the intermediate layer; and
a processor coupled to the plurality of sensors and configured to use the respective outputs of the plurality of sensors to make a determination associated with engagement of the robotic arm end effector with the item, at least in part by:
using the first value to determine a first input associated with the first factor and using the second value to determine a second input associated with the second factor;
providing the first input and the second input to a multi-factor model configured to provide, based at least in part on the first input and the second input, an output associated with engagement of the robotic arm end effector with the item; and
using the output of the multi-factor model to make the determination associated with engagement of the robotic arm end effector with the item.

2. The robotic system of claim 1, wherein the first factor and the second factor include at least two of weight, deformation, continuity, conductivity, resistance, inductance, and capacitance.

3. The robotic system of claim 1, wherein the plurality of measurement objects includes a plurality of magnets and one or more magnetic sensors.

4. The robotic system of claim 3, wherein the plurality of magnets are arranged in a grid.

5. The robotic system of claim 3, wherein at least one of the plurality of magnets is located on a boundary associated with the tactile sensing unit.

6. The robotic system of claim 1, wherein the first sensor includes an emitter and a receiver.

7. The robotic system of claim 1, wherein the plurality of measurement objects include a plurality of markers and an image sensor.

8. The robotic system of claim 1, wherein the plurality of sensors include one or more electro-mechanical sensors.

9. The robotic system of claim 1, wherein the plurality of sensors include a pressure sensor coupled to a flexible membrane that includes a gas or a liquid.

10. The robotic system of claim 1, wherein the second sensor includes a conductive material.

11. The robotic system of claim 1, wherein the plurality of sensors includes a force sensor attached to a wrist portion of the robotic arm end effector.

12. The robotic system of claim 1, wherein the first factor is associated with a first coefficient and the second factor is associated with a second coefficient.

13. The robotic system of claim 12, wherein the first coefficient and the second coefficient are equal.

14. The robotic system of claim 12, wherein the first coefficient and the second coefficient are different.

15. The robotic system of claim 1, wherein the respective outputs of the plurality of sensors are provided to the processor when a static measurement is performed and when a dynamic measurement is performed.

16. The robotic system of claim 1, wherein the output of the multi-factor model indicates the robotic arm end effector successfully grasped the item.

17. The robotic system of claim 1, wherein the output of the multi-factor model indicates the robotic arm end effector did not successful grasp the item.

18. The robotic system of claim 1, wherein the output of the multi-factor model indicates that human intervention is needed.

19. The robotic system of claim 1, wherein the output of the multi-factor model indicates the robotic arm end effector is to engage a different item.

20. A method, comprising:
using a first value sensed by a first sensor of a plurality of sensors included in a tactile sensing unit to determine a first input associated with a first factor and using a second value sensed by a second sensor of the plurality of sensors included in the tactile sensing unit to determine a second input associated with a second factor, wherein each of the plurality of sensors are configured to provide an output that reflects a sensed value associated with engagement of a robotic arm end effector with an item, wherein the first and second factors are different, wherein the tactile sensing unit is comprised of a plurality of layers, wherein an intermediate layer of the plurality of layers includes a plurality of measurement objects that are embedded in a material associated with the intermediate layer and a layer below the intermediate layer includes the first sensor, wherein the first sensor is configured to measure a value associated with the plurality of measurement objects that are embedded in the material associated with the intermediate layer;

providing the first input and the second input to a multi-factor model configured to provide, based at least in part on the first input and the second input, an output associated with engagement of the robotic arm end effector with the item; and using the output of the multi-factor model to make a determination associated with engagement of the robotic arm end effector with the item.

21. A computer program product embodied in a non-transitory computer readable medium and comprising computer instructions for:

using a first value sensed by a first sensor of a plurality of sensors included in a tactile sensing unit to determine a first input associated with a first factor and using a second value sensed by a second sensor of the plurality of sensors included in the tactile sensing unit to determine a second input associated with a second factor, wherein each of the plurality of sensors are configured to provide an output that reflects a sensed value associated with engagement of a robotic arm end effector with an item, wherein the first and second factors are different, wherein the tactile sensing unit is comprised of a plurality of layers, wherein an intermediate layer of the plurality of layers includes a plurality of measurement objects that are embedded in a material associated with the intermediate layer and a layer below the intermediate layer includes the first sensor, wherein the first sensor is configured to measure a value associated with the plurality of measurement objects that are embedded in the material associated with the intermediate layer;

providing the first input and the second input to a multi-factor model configured to provide, based at least in part on the first input and the second input, an output associated with engagement of the robotic arm end effector with the item; and using the output of the multi-factor model to make a determination associated with engagement of the robotic arm end effector with the item.

* * * * *